United States Patent [19]

Cutter

[11] 4,426,724
[45] Jan. 17, 1984

[54] X-RAY CASSETTE HOLDER

[76] Inventor: James W. Cutter, 85 Frank's Dr., Hollister, Calif. 95023

[21] Appl. No.: 318,737

[22] Filed: Nov. 6, 1981

[51] Int. Cl.³ .............................................. H05G 1/00
[52] U.S. Cl. .................................... 378/181; 378/182
[58] Field of Search ........................ 378/167, 181, 182

[56] References Cited

U.S. PATENT DOCUMENTS 3,764,808  10/1973  Lackey et al. ...................... 378/181

FOREIGN PATENT DOCUMENTS 66780  5/1969  German Democratic Rep. .................................... 378/182

Primary Examiner—Alfred E. Smith
Assistant Examiner—T. N. Grigsby
Attorney, Agent, or Firm—Hamrick, Hoffman & Guillot

[57] ABSTRACT

An X-ray cassette holder (10, 10') includes a frame (12) on which an associated X-ray cassette C is to be centered by two pairs of opposed clamp members 52, 52' and 54, 54' slideably arranged on the frame (12) for movement toward and away from one another in first and second perpendicular directions of movement. At least one pair of opposed clamp members are resiliently connected to an actuator arrangement (18) which will cause the members to move toward one another and center an associated cassette C on the holder frame (12) as holder (10, 10') is being inserted into an associated X-ray machine.

14 Claims, 6 Drawing Figures

U.S. Patent    Jan. 17, 1984    Sheet 1 of 3    4,426,724
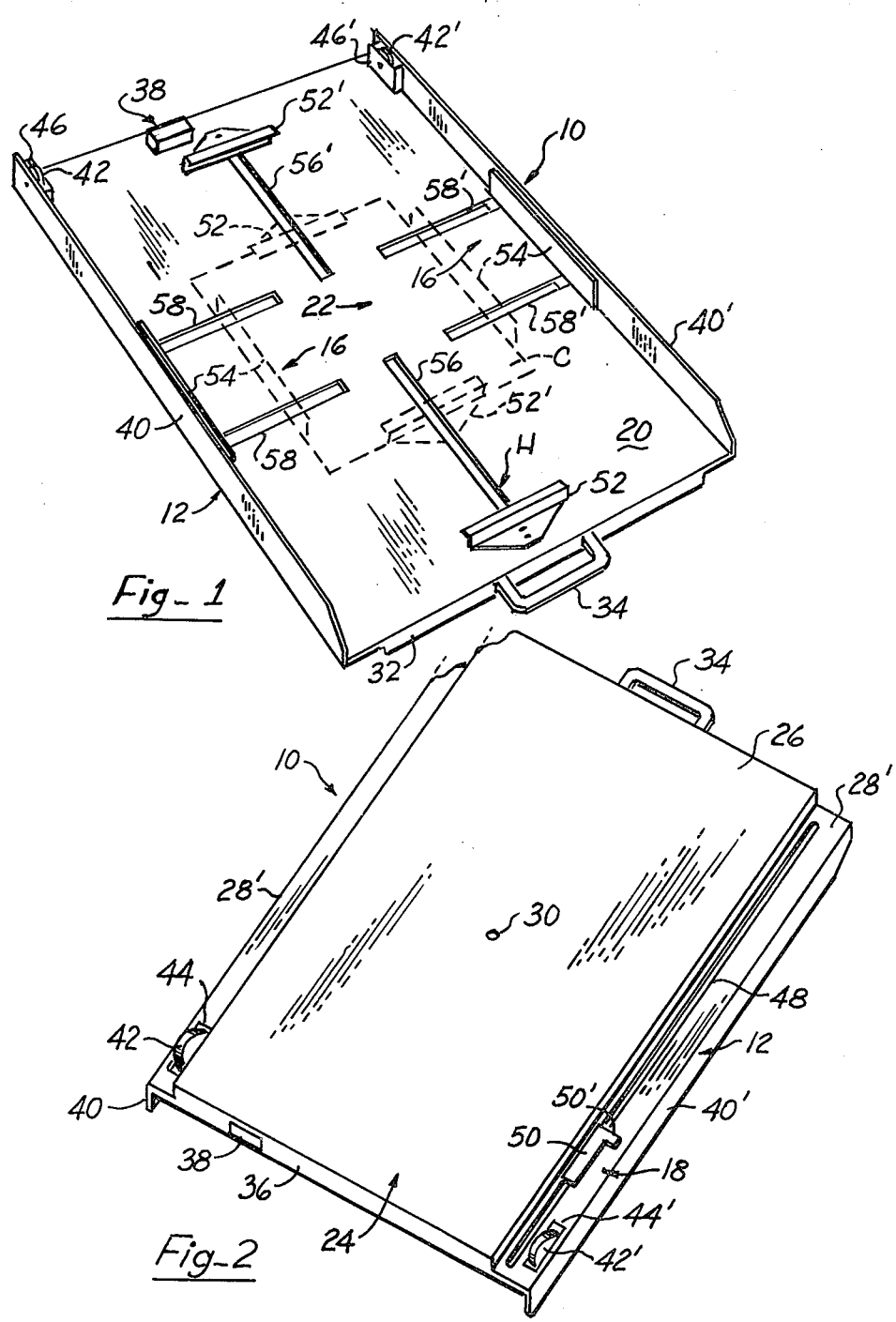
Fig_1
Fig_2

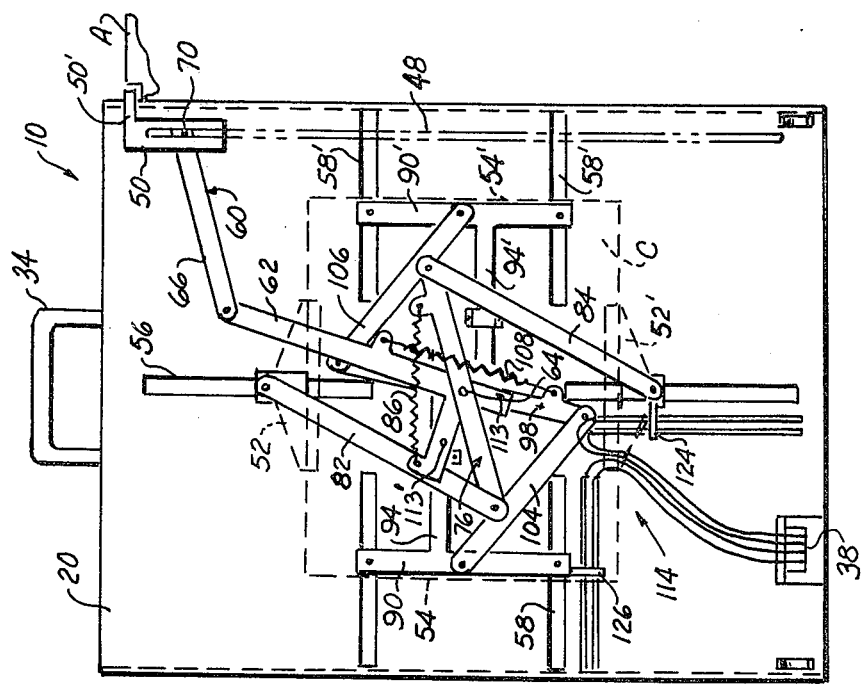
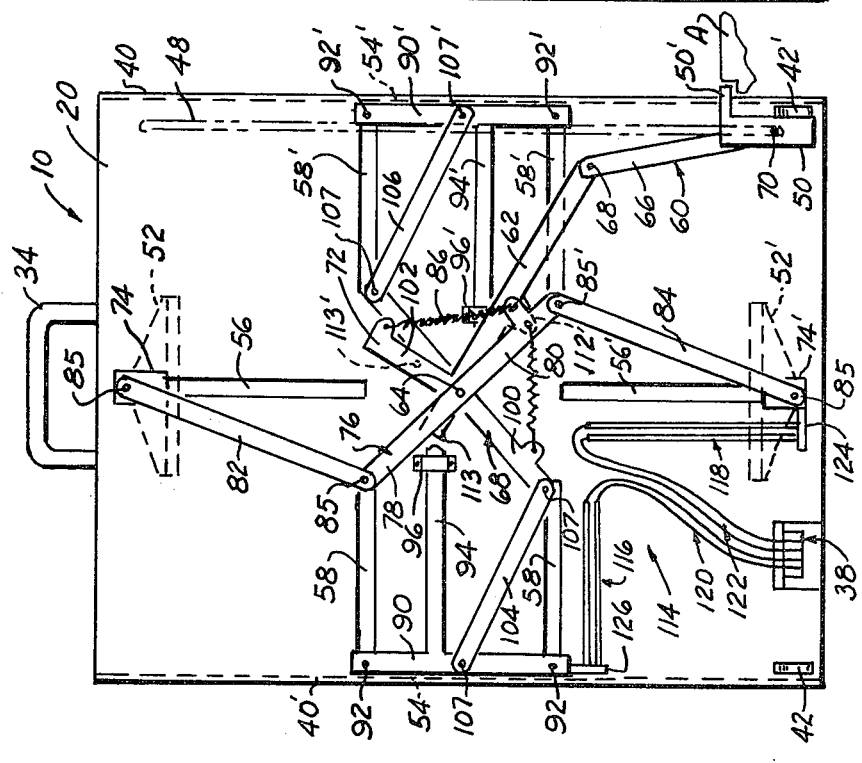

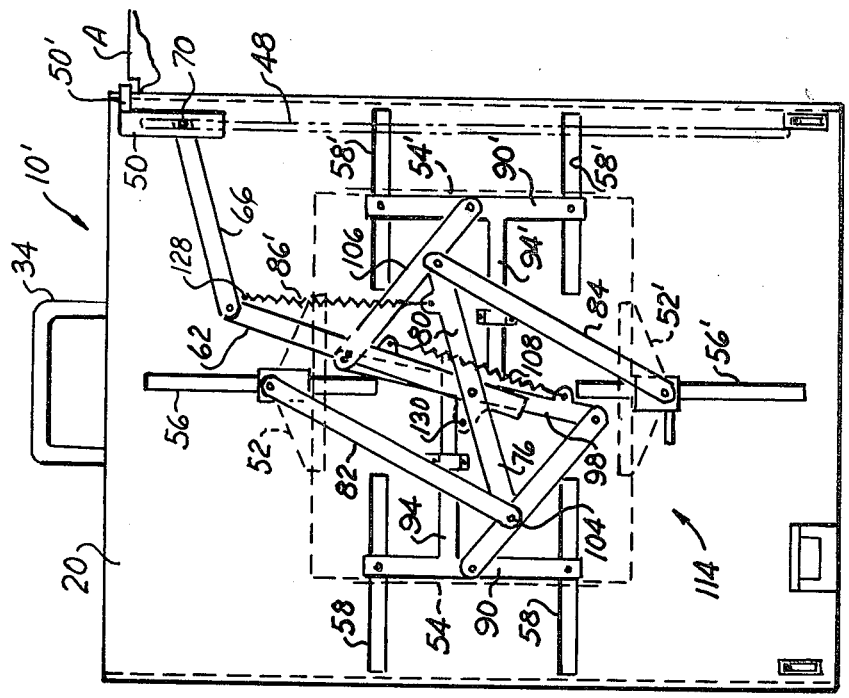
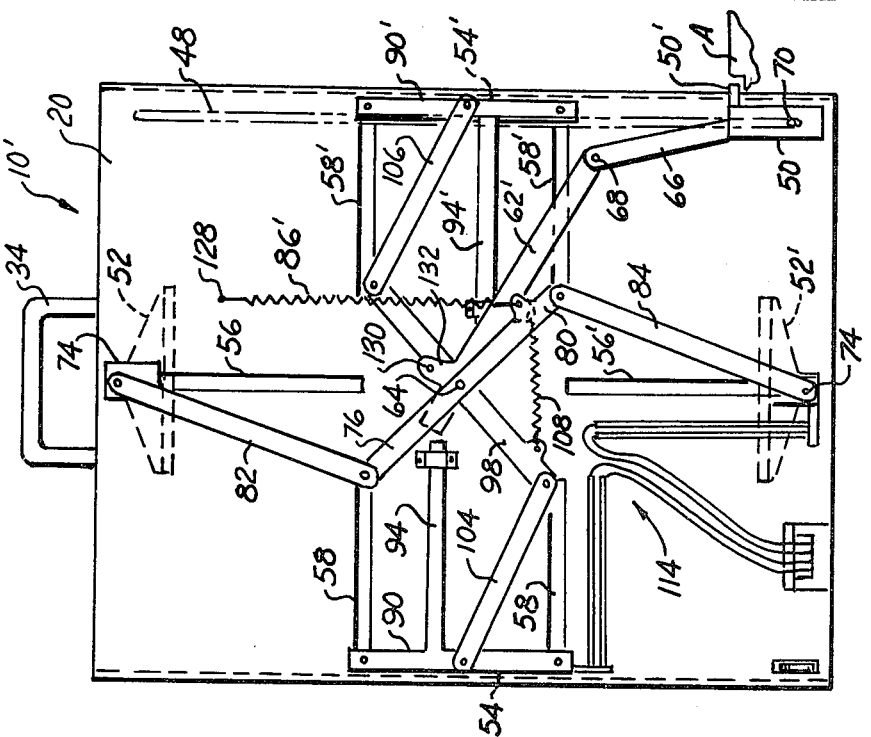

X-RAY CASSETTE HOLDER

BACKGROUND OF THE INVENTION

1. Field of the Invention

This invention relates generally to X-ray apparatus, and more particularly to apparatus for centering an X-ray cassette in an X-ray beam adjusting X-ray cassette holder.

2. Description of the Prior Art

Film or other sensitive material exposed to X-rays for medical diagnostic purposes commonly is packaged in cassettes of varying sizes to suit particular purposes. Since the sensitive material area of a specific cassette should be exactly impinged by an X-ray beam, it is desirable to limit the size of the X-ray beam to substantially the exact size of the sensitive material in the cassette. Otherwise, a patient being X-rayed may be subjected to excessive radiation and potential health hazards, or the film or other sensitive material in the cassette may be inadvertently fogged and ruined for its purpose.

Although adjustment of the X-ray beam can be performed manually by an operator of the machine, it is preferable to have the X-ray beam automatically adjusted to conform to a particular cassette size. U.S. Pat. No. 3,764,808, issued Oct. 9, 1973, to R. R. Lackey, et al, discloses apparatus for this purpose. This device employs a pair of continuously variable transducers, such as rotary potentiometers, mounted on a cassette holder and engageable with a cassette in order to determine its size. One of the transducers employs a pair of jaws attached to a cable arrangement for centering a cassette in a first direction, while the other transducer is adjusted by a pivoted arm mounted on the cassette holder and disposed for contacting one side of a cassette centered between the aforementioned jaws. A problem encountered with this arrangement is that the cassette may not be centered in a second direction perpendicular to the first direction so as to give an erroneous reading to the other of the transducers, resulting in an improper reading of sides of a cassette mmounted on the holder.

SUMMARY OF THE PRESENT INVENTION

It is an object of the present invention to provide apparatus for sensing both the width and the length of a cassette which is more reliable than known apparatus of this kind.

It is another object of the present invention to provide X-ray cassette holder apparatus which will center an associated cassette in two perpendicular directions in order to eliminate any possible error in positioning and determining the size of a particular cassette.

Yet another object of the present invention is to provide X-ray cassette holder apparatus which will automatically center an X-ray cassette when the holder is inserted into an associated X-ray machine, and simultaneously connect sensing instruments mounted on the holder for determining the size of a particular cassette to control circuitry in the associated X-ray machine for proportionally adjusting the size of an X-ray to be emmitted by the machine.

Briefly, these and other objects are achieved according to the present invention by providing an X-ray cassette holder having a frame on which are provided first and second positioning assemblies arranged for centering an associated cassette with respect to the frame of the holder and at least one of which positioning assemblies is operated by an actuator arrangement connected to the positioning assembly as the holder frame is inserted into an associated X-ray machine. Preferably, both positioning assemblies are connected to the actuator arrangement for operation thereby so as to assure centering of an associated set as the holder is placed into an associated machine. A sensor arrangement advantageously comprising a pair of linear potentiometers is mounted on the frame of the holder and operably connected to the positioning assemblies for generating a signal as a function of the locations of the positioning assemblies when the holder is in position in an associated X-ray machine so as to instruct X-ray beam adjusting mechanisms of the associated X-ray machine to appropriately size the X-ray beam prior to exposure to such beam of film or other sensitive material in the cassette.

It is an advantage of the present invention that the size of an X-ray cassette can be determined in a reliable manner.

It is another advantage of the present invention that operator error in setting the beam size for a particular X-ray cassette being used is substantially eliminated.

These and other objects and advantages of the present invention will no doubt become apparent to those of ordinary skill in the art after having read the following detailed description of the preferred embodiments which are illustrated in the several figures of the drawing.

IN THE DRAWINGS

FIG. 1 is a diagrammatic, perspective view showing a cassette holder constructed in accordance with the present invention;

FIG. 2 is a diagrammatic, perspective view looking from the bottom in FIG. 1;

FIG. 3 is a diagrammatic, plan view looking in the general direction of FIG. 2, but with parts removed to reveal the interior construction of a cassette holder in accordance with the present invention;

FIG. 4 is a diagrammatic, plan view similar to FIG. 3, but showing the arrangement of elements of the holder when same has been inserted into an associated X-ray machine;

FIG. 5 is a diagrammatic, plan view similar to FIG. 3, but showing a modified embodiment of a cassette holder constructed in accordance with the present invention; and FIG. 6 is a diagrammatic, plan view similar to FIG. 4, but showing the embodiment of FIG. 5 when same has been inserted into an associated X-ray machine.

DESCRIPTION OF THE PREFERRED EMBODIMENTS

Referring now more particularly to FIGS. 1 and 2 of the drawings, an X-ray cassette holder 10 according to the present invention comprises a frame 12 on which are provided a first positioning assembly 14 for moving an associated X-ray cassette C in a first direction, and a second positioning assembly 16 for moving cassette C in a second direction perpendicular to the first direction. An actuator arrangement 18 is connected to at least one of the aforementioned positioning assemblies 14 and 16 in a manner to be described below so as to move such assembly into a position centering cassette C as frame 12 is inserted into an associated X-ray machine.

Frame 12 is of generally rectangular construction and includes a planar member 20 generally rectangular in plan and defining a mid-area or mid-point 22 relative to which an associated X-ray cartridge C is to be centered. Disposed over and partially surrounding member 20 is a cover 24 comprising a substantially planar and rectangular central portion 26 bordered on opposed sides by planar peripheral portions 28 and 28' offset from the plane of portion 26. Cover 24 also is provided with a mid-point 30 disposed centrally of portion 26, which point 30 corresponds to mid-point 22 of member 20. Suitable screw fasteners (not shown), and the like, can be placed at points 22 and 30 for retaining cover 24 and for a purpose which will become clear below. One end 32 of frame 12 is enclosed and provided with a suitable handle 34 for facilitating manipulation of holder 10, while the opposed end 36 is provided with a recess for receiving a conventional electrical connector 38, and the like, for connecting sensing apparatus contained within frame 12, and to be described below, to control circuitry (not shown) of a conventional X-ray machine in order to adjust the size of an X-ray beam emmitted by such machine. Cover 24 also includes a pair of sides 40, 40' extending perpendicularly from peripheral portions 28, 28', and has provided adjacent end 36 rollers 42 and 42' rotatably mounted in a suitable, known manner in windows 44 and 44', respectively, provided in peripheral portions 28 and 28', and enclosed by wells 46 and 46' extending from both peripheral portions 28 and 28' and sides 40 and 40' of cover 24.

Provided on peripheral portion 28' is a slot 48 extending the length of portion 28' and having arranged for sliding movement therein a slide 50 provided with a lug 50' arranged for engaging an abutment A (FIG. 3) provided on an associated X-ray machine and being moved thereby relative to frame 12. As will become clear below, slide 50 and lug 50' form part of actuator arrangement 18 and will operate at least one of positioning assemblies 14 and 16 in a manner to be described below on insertion of holder 10 into an associated X-ray machine.

Each of the positioning assembles 14 and 16 includes a pair of clamp members 52, 52' and 54, 54' slideably mounted on member 20 of frame 12 by provision in member 20 of slots 56, 56' and pairs of slots 58, 58', respectively, so as to be arranged substantially symmetrically of mid-point 22 of member 20 for movement toward and away from one another.

Referring now to FIGS. 3 and 4 of the drawings, a mechanism 60 will now be described which connects slide 50, and lug 50', to positioning assemblies 14 and 16 so as to move clamp members 52, 52' and 54, 54' relative to member 20 of frame 12 as a result of movement of slide 50 along its associated slot 48.

Mechanism 60 includes a crank 62 pivotally mounted at mid-point 22 of planar member 20 of frame 12 as by the illustrated pin 64. A screw (not shown) at point 22 of member 20 can retain pin 64. Attached to an outward end of crank 62 is one end of a link 66 which connects crank 62 to slide 50. Pivotal attachment of link 66 to crank 62 and slide 50 may be effected in any suitable manner, such as by the illustrated pins 68 and 70. A projection 72 is advantageously provided on crank 62 so as to extend from the area of pin 64 for a purpose to be described below.

Clamp members 52 and 52' are slideably retained in slots 56 and 56' provided in planar member 20 of frame 12 as by the illustrated blocks 74 and 74', respectively, connected to the associated clamp member 52, 52' as by a suitable web (not shown). Positioning assembly 14 includes a lever 76 having a pivot point about pin 64 and provided with two arms 78 and 80 arranged extending away from one another and from pin 64. In this manner, lever 76 is pivotally mounted at the mid-area of planar member 20 of frame 12. A first element 82 and second element 84 each are pivotally attached to a respective one of the arm 78 and 80 of lever 76 and also connected to a respective one of clamp members 52 and 52' as by the illustrated pins 85, 85' so as to form a double slider-crank mechanism.

A conventional coiled tension spring 86, and the like, is connected between an ear 88 formed adjacent the outward end of arm 80 of lever 76 and projection 72 of crank 62 so as to resiliently connect arm 80 to actuator mechanism 60 and cause clamp members 52 and 52' to be moved toward and away from one another by sliding movement of slider 50 in its associated slot 48.

A pin, or dog; 113 is affixed to crank 62 and arranged projecting upwardly for preventing spring 86 from rotating lever 76 beyond the relationship with crank 62 illustrated in FIG. 3. Pin 113 also provides sufficient force to lever 76 to move clamps 52 open when crank 62 is rotated by movement of slide 50 from the FIG. 4 position to the FIG. 3 position.

In a similar manner, a pin, or dog, 113' is affixed to crank 62 and is arranged projecting downwardly for forming the same relationship and performing the same function as pin 113, but relates to lever 98 and clamps 90.

Turning now to positioning assembly 16, each of the clamp members 54 and 54' is slideably disposed in its associated slots 58 and 58' formed in member 20 of frame 12 by bars 90 and 90' secured to respective members 54, 54' by the illustrated pins 92 and 92' arranged extending through respective slots 58 and 58'. Extending perpendicularly from each of the members 90 and 90' and arranged in the same plane therewith is a guide member 94 and 94' arranged extending through an associated generally U-shaped strap 96, 96' secured in a suitable manner, such as by rivots or screw fasteners, to planar member 20. It will be appreciated that this arrangement of the positioning assembly 16 will cause the clamp members 54 and 54' to be stabalized as they slide to-and-fro in their respective pairs of slots 58 and 58'.

Positioning assembly 16 further includes a lever 98 similar to lever 76 and having two arms 100 and 102 extending away from one another and from a pivot point of lever 98 formed by pin 64 on which lever 98 is pivotally mounted. A first element 104 and a second element 106 each are pivotally attached to a respective one of the arms 100 and 102 of lever 98 and to a respective one of clamp member 54 and 54' as by the illustrated pins 107 and 107' so as to form a double slider/crank mechanism similar to that of positioning assemlby 14. In the embodiment of the invention illustrated in FIG. 3 of the drawings, a spring 108, which can be a conventional coil tension spring similar to spring 86, is connected between an ear 110 provided on arm 100 of lever 98 and an ear 112 which is provided on crank 62 substantially midway between pin 64 and pin 68 in order to resiliently connect arm 100 of lever 98 to actuator mechanism 60 and cause clamp members 54 and 54' to move toward and away from one another in equal amounts from pin 64 by movement of slide 50 along slot 48.

A sensor arrangement 114 is mounted on frame 12, specifically on the inner face of planar member 20, and operably connected to positioning assemblies 14 and 16 for generating a signal as a function of a position of assemblies 14 and 16 and feeding such signal to connector 38 for transmission to control circuitry (not shown) of an associated X-ray machine. Since the construction of an X-ray machine with which holder 10 is to be used is conventional and well-known, construction of such a machine will not be described in detail herein. It is to be understood that holder 10 is of a conventional size configuration as to fit into X-ray machines conventionally available and in common usage.

Sensor arrangement 114 includes a pair of linear potentiometers 116 and 118 of conventional construction and electrically connected to the connector 38 as by the illustrated pairs of wires 120 and 122. Each of the potentiometers 116 and 118 has associated therewith a respective wiper for varying the output thereof, which wipers are in the form of fingers 124 and 126 affixed to block 74' and bar 92 so as to give respective position readings for clamp members 52, 52' and 54, 54' as a function of the position of the finger 124, 126 on an associated potentiometer 116, 118. A collimator (not shown) of an associated X-ray device conventionally as shutters (not shown) controlled by the output of potentiometers 116, 118 to limit exposure as appropriate.

Referring now to FIG. 4 in conjunction with FIG. 3, the manner in which the holder 10 according to the invention centers a cassette C while simultaneously determining the size thereof will now be discussed.

FIG. 3 illustrates holder 10 with slide 50 positioned at one end of associated slot 48, that end being adjacent rollers 42, 42' wherein clamp members 52, 52' and 54, 54' are in an open position. That is, the clamp members 52, 52' and 54, 54' are spaced as far from one another, and center pin 64, as their associated slots 56, 56' and 58, 58' permit. As illustrated in FIG. 3, however, holder 10 is about to be inserted into an associated X-ray machine, illustrated in part by abutment A seen in the lower right hand portion of FIG. 3. Lug 50' of slide 50 will engage this abutment A as illustrated, and as the holder 10 is inserted into the associated X-ray machine slide 50 will be drawn due to engagement of lug 50' with abutment A along slot 48 to the position seen in FIG. 4. Movement of slide 50 along slot 48 has caused crank 62 to rotate about pin 64, which in turn has caused clamp members 52, 52' and 54, 54' to move toward one another until they engage associated sides of a cassette C being centered on holder 10. In the event, however, that cassette C is larger than the smallest size cassette that can be accommodated on holder 10, the resilient coupling of positioning assemblies 14 and 16 to actuator mechanism 60, as described above, through the use of springs 86 and 108 will permit slide 50 to continue along slot 48 to the position shown in FIG. 4 even though clamp members 52, 52' and 54, 54' are restrain from further movement by contact with the associated cassette C. But, the use of double slider-crank mechanisms in each of the positioning assemblies 14 and 16 require clamp members 52, 52' and 54, 54' to always be respective equal distances from center pin 64 so as to assure centering of the cassette C.

Referring now to FIGS. 5 and 6 of the drawings, and embodiment of the invention is illustrated which is similar to that set forth in FIGS. 3 and 4 and wherein identical parts are designated by the same reference numerals, but in which crank 62 is replaced by a crank 62' which is not provided with a projection 72, and in which spring 86 is replaced by a spring 86' attached to planar member 20 as by the illustrated post 128. This change eliminates the resilient connection of arm 80 of lever 76 to crank 62', and instead has clamp members 52 and 52' biased toward a closed or cassette C engaging position, as seen in FIG. 6, independently of the position of slide 50 of actuator arrangement 18. In this embodiment, therefore, a cassette C is first placed in position on the outwardly facing surface of planar member 20, that being the surface seen in FIG. 1 and one of the clamp members 52, 52' moved manually toward cassette C until a position is reached wherein spring 86' in over-center with respect to pin 64 and retains the clamp members 52, 52' in abutting relation to cassette C. A handle (not shown) may be provided on one of the clamp members 52, 52' for the purpose of centering cassette C in the first direction by use of clamp members 52, 52'. Now, the holder, which will be designated 10', can be inserted into an associated X-ray machine in the manner of holder 10 as described above, and movement of slide 50 along its associated slot 48 from the position in FIG. 5 to the position in FIG. 6 will cause crank 62' to bring clamp members 54, 54' toward one another in order to center cassette C in the second position. Thus, centering of cassette C in both perpendicular directions is still assured. This embodiment of the invention illustrates the importance of positioning assembly 16 being connected to slide 50 in order to assure centering of a cassette C in the second aforementioned direction when a holder according to the invention is placed in an associated X-ray machine.

A pin, or dog, 130 is affixed to an ear 132 of crank 62' and arranged projecting downwardly for preventing spring 108 from rotating lever 98 beyond the position shown in FIG. 5, and returning lever 98 to the FIG. 5 position from the FIG. 6 position. Thus, pin 130 functions similarly to pin 113'.

As can be readily understood from the above description and from the drawings, an X-ray cassette holder according to the present invention permits coordination of an associated X-ray beam to the size of a cassette disposed in a holder according to the invention in a reliable manner which assures that the cassette will always be centered with respect to the holder and in a predetermined relationship to size determining devices.

Whereas the preferred embodiment of the present invention has been described above, it is contemplated that other alterations and modification may become apparent to those skilled in the art after having read the above disclosure. It is therefore intended that the appended claims be interpreted as covering all such alterations and modifications as fall within the true spirit and scope of the invention.

What is claimed is:

1. An X-ray cassette holder, comprising, in combination:

(a) a frame including a planar member generally rectangular in plan and defining a mid-area relative to which an associated X-ray cartridge is to be centered;

(b) first positioning means provided on said frame for moving an associated X-ray cassette in a first direction;

(c) second positioning means provided on said frame for moving an associated X-ray cassette in a second direction perpendicular to the first direction, each of said first positioning means and second positioning means including a respective pair of clamp members slideably mounted on said planar member and arranged substantially symmetrically of the mid-area for movement toward and away from one another; and (d) actuator means connected to at least said second positioning means for moving same in the second direction as said frame is inserted into an associated X-ray machine, said actuator means including a lug slideably mounted on said frame and arranged for engaging an abutment provided on an associated X-ray machine and moveable thereby relative to said frame, and mechanism means connected to said lug and to at least said second positioning means for movement with said lug and sliding at least said clamp members of said second positioning means relative to said frame, said mechanism means including a crank pivotally mounted at said mid-area of said planar member of said frame, and a link pivotally attached to said crank and to said lug for pivoting said crank as said lug slides relative to said frame.

2. A holder as defined in claim 1, wherein at least one of said first positioning means and said second positioning means further includes, in combination:
   (1) a lever having a pivot point and two arms extending away from one another and from the pivot point of said lever, with said lever being pivotally mounted at the mid-area of said planar member of said frame;
   (2) a first element and a second element each being pivotally attached to a respective one of the arms of said lever and to a respective one of said clamp members of a respective one of said first positioning means and said second positioning means; and
   (3) resilient means connected to one of said arms of said lever and to said crank for biasing said lever in a direction drawing respective ones of said clamp members toward each other.

3. A holder as defined in claim 2, wherein said resilient means includes a spring connected to said lever of said first positioning means and to said planar member of said frame, and said clamp members of said first positioning means are arranged to be movable in the first direction by manual operation.

4. A holder as defined in claim 2, wherein said resilient means includes a first spring connected to said crank of said mechanism means for permitting said mechanism means to draw said clamp members of said first positioning means toward one another simultaneously with said clamp members of said second positioning means when said slide is moved relative to said frame.

5. A holder as defined in claim 4, wherein said resilient means includes a second spring connected to said lever of said first positioning means and to said crank of said mechanism means for moving said clamp members of said first positioning means simultaneous with said clamp members of said second positioning means.

6. A holder as defined in claim 4, further comprising sensor means mounted on said frame and operably connected to said first positioning means and said second positioning means for generating signals as functions of the positioning of said first positioning means and the positioning of said second positioning means.

7. A holder as defined in claim 6, wherein said sensor means includes a pair of linear potentiometers each having a wiper, the wiper of one of said potentiometers being affixed to a one of said clamp members of said first positioning means, and a wiper of the other of said pair of potentiometers being affixed to one of said clamp members of said second positioning means.

8. A holder as defined in claim 1, wherein each of said first positioning means and second positioning means further includes, in combination:
   (1) a pair of clamp members slideably mounted on said frame;
   (2) a lever having a pivot point and two arms extending away from one another and from the pivot point of said lever, with said lever being pivotally mounted on said frame;
   (3) a first element and a second element each being pivotally attached to a respective one of the arms of said lever and to a respective one of said clamp members of a respective one of said first positioning means and second positioning means; and
   (4) resilient means connected to one of said arms of said lever and to said crank for biasing said lever in a direction drawing said clamp members of a respective one of said first positioning means and second positioning means toward one another.

9. A holder as defined in claim 8, wherein said actuator means includes a slide moveably mounted on said frame, and said resilient means includes a first spring connected to said actuator means for permitting said actuator means to draw said clamp members of said first positioning means toward one another simultaneously with said clamp members of said second positioning means when said slide is moved relative to said frame.

10. A holder as defined in claim 9, wherein said resilient means includes a second spring connected to said lever of said first positioning means and to said actuator means for moving said clamp members of said first positioning means simultaneous with said clamp members of said second positioning means.

11. A holder as defined in claim 9, wherein said resilient means is connected to said lever of said first positioning means and to said frame, and said clamp members of said first positioning means are arranged to be movable in the first direction by manual operation.

12. A holder as defined in claim 1, further comprising sensor means mounted on said frame and operably connected to said first positioning means and said second positioning means for generating signals as functions of a position of said first positioning means and a position of said second positioning means, and
    wherein said first positioning means and said second positioning means each include a pair of clamp members slideably mounted on said frame for movement toward and away from one another, and said sensor means includes a pair of linear potentiometers each having a slide, the slide of one of said potentiometers being affixed to a one of said clamp members of said first positioning means, and the slide of the other of said potentiometers being affixed to a one of said clamp members of said second positioning means.

13. In an X-ray cassette holder including a frame defining a mid-area about which an associated X-ray cassette is to be centered, and a pair of opposed clamp members slideably arranged on said frame for movement toward and away from one another in a first direction for centering an associated X-ray cassette in said first direction, the improvement comprising:
    positioning means mounted on said frame for centering an associated X-ray cassette relative to said frame in a second direction perpendicular to said first direction as said frame is inserted into an associated X-ray machine; and actuator means connected to said second positioning means for moving same in the second direction as said frame is inserted into an associated X-ray machine, said actuator means including a lug slideably mounted on said frame and arranged for engaging an abutment provided on an associated X-ray machine and being moveable thereby relative to said frame, and mechanism means connected to said lug and to at least said second positioning means for moving same with said lug and sliding said clamp members of said second positioning means relative to said frame, said mechanism means including a crank pivotally mounted at said mid-area of said planar member of said frame, and a link pivotally attached to said crank and to said lug for pivoting said crank as said lug slides relative to said frame.

14. A holder as defined in claim 13, wherein each of said first positioning means and second positioning means further includes, in combination:
(1) a lever having a pivot point and two arms extending away from one another and from the pivot point of said lever, with said lever being pivotally mounted at the mid-area of said planar member of said frame;
(2) a first element and a second element each being pivotally attached to a respective one of the arms of said lever and to a respective one of said clamp members of a respective one of said first positioning means and said second positioning means; and
(3) resilient means connected to a one of said arms of said lever and to one of said frame and said second positioning means for biasing said lever in a direction drawing said clamp members of a respective one of said first positioning means and said second positioning means toward one another.

* * * * *